(12) United States Patent
Hedderman et al.

(10) Patent No.: US 9,120,957 B2
(45) Date of Patent: *Sep. 1, 2015

(54) CYANOACRYLATE COMPOSITIONS

(71) Applicant: Henkel IP & Holding GmbH, Duesseldorf (DE)

(72) Inventors: Patricia A. Hedderman, Dublin (IE); Emer Ward, Saggart Co., Dublin (IE); William Hally, Naas Co., Kildare (IE); Deborah A. Moore, Dublin (IE); Cormac Duffy, Dundalk Co., Louth (IE); Marisa Phelan, Roscrea Co., Tipperary (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,335

(22) Filed: Jan. 14, 2014

(65) Prior Publication Data

US 2014/0124137 A1   May 8, 2014

Related U.S. Application Data

(63) Continuation of application No. PCT/IB2012/053535, filed on Jul. 10, 2012.

(60) Provisional application No. 61/508,119, filed on Jul. 15, 2011.

(51) Int. Cl.
| | | |
|---|---|---|
| *C08K 5/00* | (2006.01) | |
| *C08L 37/00* | (2006.01) | |
| *C09J 133/18* | (2006.01) | |
| *C09J 4/00* | (2006.01) | |
| *B29C 65/48* | (2006.01) | |

(52) U.S. Cl.
CPC ............ *C09J 133/18* (2013.01); *B29C 65/484* (2013.01); *C09J 4/00* (2013.01)

(58) Field of Classification Search
USPC ........................................................ 524/287
See application file for complete search history.

(56) References Cited

U.S. PATENT DOCUMENTS

| | | | |
|---|---|---|---|
| 3,832,334 A | | 8/1974 | O'Sullivan et al. |
| 4,196,271 A | | 4/1980 | Yamada et al. |
| 4,440,910 A | | 4/1984 | O'Connor |
| 4,450,265 A | * | 5/1984 | Harris ............................ 526/298 |
| 4,490,515 A | | 12/1984 | Mariotti et al. |
| 4,532,293 A | | 7/1985 | Ikeda et al. |
| 4,556,700 A | | 12/1985 | Harris et al. |
| 4,622,414 A | | 11/1986 | McKervey |
| 4,636,539 A | | 1/1987 | Harris et al. |
| 4,695,615 A | | 9/1987 | Leonard et al. |
| 4,718,966 A | | 1/1988 | Harris et al. |
| 4,837,260 A | * | 6/1989 | Sato et al. ...................... 524/261 |
| 4,855,461 A | | 8/1989 | Harris |
| 4,906,317 A | | 3/1990 | Liu |
| 5,288,794 A | * | 2/1994 | Attarwala ...................... 524/714 |
| 5,312,864 A | | 5/1994 | Wenz et al. |
| 5,530,037 A | | 6/1996 | McDonnell et al. |
| 6,607,632 B1 | | 8/2003 | McDonnell et al. |
| 7,446,136 B2 | * | 11/2008 | Rubinsztajn .................. 523/216 |

FOREIGN PATENT DOCUMENTS

| | | |
|---|---|---|
| JP | 50069013 | 6/1975 |
| JP | 1182385 | 7/1989 |

OTHER PUBLICATIONS

International Search Report issued in connection with International Patent Application No. PCT/IB2012/053535 mailed on Nov. 5, 2012.
H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).
G.H. Millet, "Cyanoacrylate Adhesives" in Structural Adhesives: Chemistry and Technology, S.R. Hartshorn, ed., Plenun Press, New York, p. 249-307 (1986).

* cited by examiner

*Primary Examiner* — Hui Chin
(74) *Attorney, Agent, or Firm* — Steven C. Bauman

(57) ABSTRACT

Cyanoacrylate-containing compositions that include, in addition to the cyanoacrylate component, a hydrogenated anhydride and optionally a benzonitrile, are provided. Cured products of the inventive cyanoacrylate compositions demonstrate improved heat resistance without compromising fixture time, stability or color.

19 Claims, 2 Drawing Sheets

CYANOACRYLATE COMPOSITIONS

BACKGROUND

1. Field

This invention relates to cyanoacrylate-containing compositions that include, in addition to the cyanoacrylate component, a hydrogenated phthalic anhydride and optionally a benzonitrile. Cured products of the inventive cyanoacrylate compositions demonstrate improved heat resistance without compromising fixture time, stability or color.

2. Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

U.S. Pat. No. 5,288,794 (Attarwala) is directed to an improved cyanoacrylate monomer adhesive formulation, where an effective amount, for enhancing the thermal resistance of the polymerized adhesive, of a mono, poly or hetero aromatic compound characterized by at least three substitutions on an aromatic ring thereof, two or more of the substitutions being electron withdrawing groups, is provided. Examples of the aromatic compound are given as 2,4-dinitrofluorobenzene; 2,4-dinitrochlorobenzene; 2,4-difluoronitrobenzene; 3,5-dinitrobenzonitrile; 2-chloro-3,5-dinitrobenzonitrile; 4,4'-difluoro-3,3'-dinitrophenyl sulfone; pentafluoronitrobenzene; pentafluorobenzonitrile; α,α,α-2-tetrafluoro-p-tolunitrile and tetrachloroterphthalonitrile.

Prior to the discovery in the '794 patent, numerous attempts have been made to improve the thermal stability of cyanoacrylate adhesive bonds.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lapshears than in those of aluminium).

U.S. Pat. No. 4,532,293 is directed to the use of benzephenonetetracarboxylic acid or its anhydride and is said to provide a superior heat resistance for cyanoacrylate adhesives.

U.S. Pat. No. 4,490,515 is directed to cyanoacrylate compositions containing certain maleimide or nadimide compounds to improve hot strength properties.

Notwithstanding the state of the art and the efforts to date to improve the heat resistance of cyanoacrylate compositions, there remained a long felt, yet unmet, need to provide such heat resistance to cured reaction products of such cyanoacrylate compositions without compromising fixture time, stability or color of the cyanoacrylate compositions themselves. Until now.

SUMMARY

Cyanoacrylate compositions, which include beyond the cyanoacrylate component, a hydrogenated anhydride and optionally a benzonitrile, are thus provided.

The inclusion of the hydrogenated anhydride noted above, with or without the benzonitrile, provides for improved properties, such as heat resistance, without compromising fixture speeds, stability and/or color, when compared to comparable cyanoacrylate compositions, (1) without either a hydrogenated phthalic anhydride or (2) a benzonitrile, with one, but not the other and with phthalic anhydride itself, as is shown in the Examples.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions, and a method of conferring improved thermal resistance to a cured reaction product of a cyanoacrylate composition, without compromising at least one of fixture time, stability or color.

The invention will be more fully understood by a reading of the section entitled "Detailed Description", which follows.

DETAILED DESCRIPTION

Figure 1:
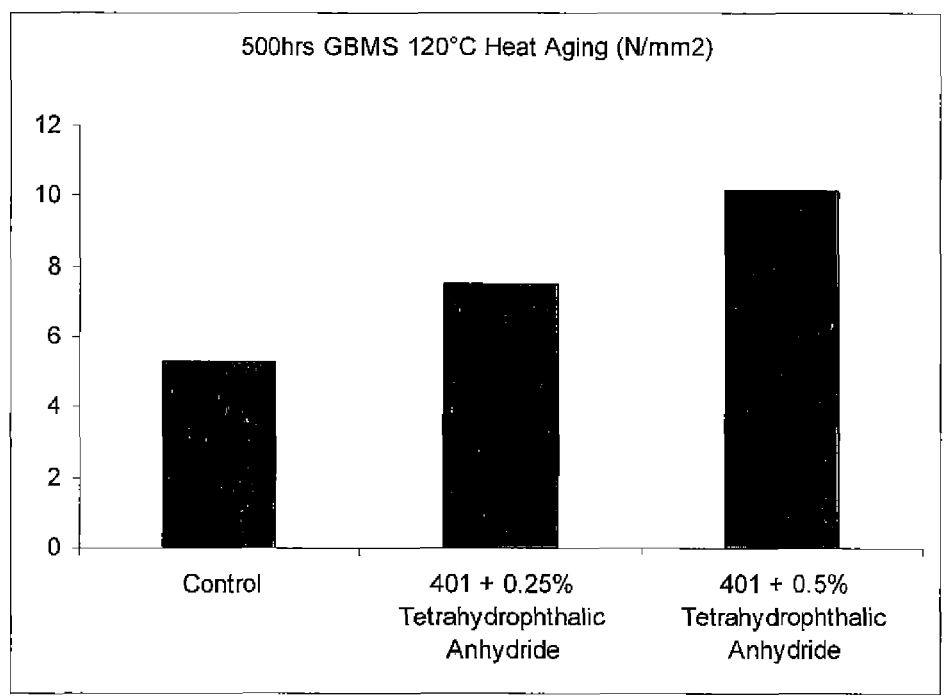
FIG. 1 depicts a bar chart of shear strength retained after heat aging at a temperature of 120° C. for a period of time of 500 hours for a cyanoacrylate composition with a hydrogenated anhydride at two different levels compared with a control, LOCTITE 401, on grit blasted mild steel substrates.

As noted above, this invention is directed to a cyanoacrylate composition, which includes beyond the cyanoacrylate component, a hydrogenated anhydride and optionally a benzonitrile.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 50% to about 99.98% by weight, with the range of about 90% to about 99% by weight being desirable, and about 95% by weight of the total composition being particularly desirable.

The hydrogenated anhydride ordinarily should be a hydrogenated phthalic anhydride, such as 3,4,5,6-tetrahydro phthalic anhydride. However, isomeric versions thereof and partially hydrogenated versions of phthalic anhydride may also be used.

The hydrogenated phthalic anhydride should be used in an amount up to about 0.1% by weight, such as within the range of about 0.01 to about 0.09, desirably within the range of about 0.03 to about 0.05% by weight. At such level, a product label generated under the EINECS regulatory regime in Europe would not need to carry a "skin sensitizer" warning in order to be in compliance with that portion of the regulations.

When used, the benzonitrile should be chosen from mono-, poly- or hetero-aromatic compounds characterized by at least three substitutions on an aromatic ring thereof, with two or more of the substitutions being electron withdrawing groups. Specific examples of such benzonitriles include 3,5-dinitrobenzonitrile; 2-chloro-3,5-dinitrobenzonitrile; pentafluorobenzonitrile; α,α,α-2-tetrafluoro-p-tolunitrile; and tetrachloroterphthalonitrile.

Again, when used the benzonitrile compound should be present in an amount up to about 5% by weight, like about 0.01% to about 3% by weight, such as about 0.1% to about 1% by weight, with about 0.5% by weight being particularly desirable.

Desirably, the 3,4,5,6-tetrahydrophthalic anhydride should be used in an amount of up to about 0.1% by weight, such as about 0.01% to about 0.1% by weight, and the pentafluorobenzonitrile should be used in an amount of up to about 0.5% by weight, such as about 0.01% to about 0.5% by weight.

Accelerators may also be included in the inventive cyanoacrylate compositions, such as any one or more selected from calixarenes and oxacalixarenes, silacrowns, crown ethers, cyclodextrins, polyethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

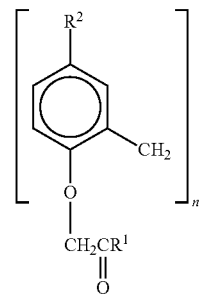

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, any one or more of 15-crown-5,18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4,1,2-decalyl-15-crown-5,1,2-naphtho-15-crown-5,3,4,5-naphtyl-16-crown-5,1,2-methyl-benzo-18-crown-6,1,2-methylbenzo-5,6-methylbenzo-18-crown-6,1,2-t-butyl-18-crown-6,1,2-vinylbenzo-15-crown-5,1,2-vinylbenzo-18-crown-6,1,2-t-butyl-cyclohexyl-18-crown-6, asym-dibenzo-22-crown-6 and 1,2-benzo-1,4-benzo-5-oxygen-20-crown-7 may be used. See U.S. Pat. No. 4,837,260 (Sato), the disclosure of which is hereby expressly incorporated herein by reference. Of the silacrowns, again many are known, and are reported in the literature.

Specific examples of silacrown compounds useful in the inventive compositions include:

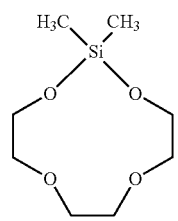

dimethylsila-11-crown-4;

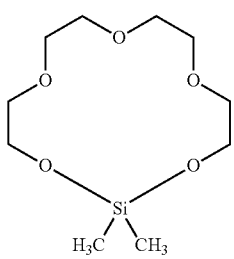 [SMILES: C[Si]1(C)OCCOCCOCCOCCO1]

dimethylsila-14-crown-5;

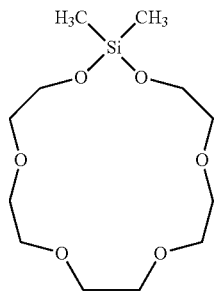 [SMILES: C[Si]1(C)OCCOCCOCCOCCOCCO1]

and dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

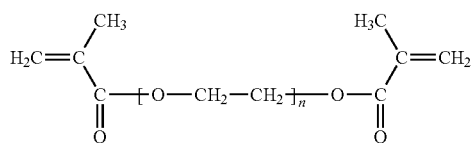

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

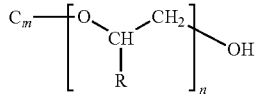

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included in the inventive cyanoacrylate compositions, such as certain acidic materials (like citric acid), thixotropy or gelling agents, thickeners, dyes, thermal degradation resistance enhancers, and combinations thereof.

In another aspect of the invention, there is provided a method of bonding together two substrates, which method includes applying to at least one of the substrates a composition as described above, and thereafter mating together the substrates for a time sufficient to permit the adhesive to fixture.

In yet another aspect of the invention, there is provided reaction products of the so-described compositions.

In still another aspect of the invention, there is provided a method of preparing the so-described compositions. The method includes providing a cyanoacrylate component, and combining therewith with mixing a hydrogenated anhydride and optionally a benzonitrile compound.

The invention will be further illustrated by the examples which follow.

EXAMPLES

All samples were prepared by mixing together the noted constituents for a sufficient period of time to ensure substantial homogeneity of the constituents. Ordinarily, about 30 minutes should suffice, depending of course on the quantity of the constituents used.

Initially, a variety of maleic anhydride derivatives were evaluated in ethyl cyanoacrylate compositions, results of which are set forth below in Table 1. All but 2,3-dimethylmaleic anhydride led to unacceptable changes in speed of cure (or, fixture time) or color formation in the compositions.

TABLE 1

| Added Anhydride | Added Level | Appearance | Fixture Time (secs) Mild Steel | Fixture Time (secs) Paper | Heat Aging (N/mm$^2$) 500 hrs 120° C. on GBMS | Accelerated Aging for 3 Days @ 82° C. Fixture Time (secs) Mild Steel | Accelerated Aging for 3 Days @ 82° C. Fixture Time (secs) Paper |
|---|---|---|---|---|---|---|---|
| — | — | | <10 | <10 | 2.29 | 10-20 | <10 |
| Maleic Anhydride | 0.25% | Colorless | >60 | >60 | nt | nt | nt |
| Maleic Anhydride | 0.50% | Colorless | >120 | >60 | nt | nt | nt |
| 2,3-Diphenyl Maleic Anhydride | 0.25% | Yellow | na | na | nt | nt | nt |
| 2,3-Diphenyl Maleic Anhydride | 0.50% | Yellow | na | na | nt | nt | nt |
| 2,3-Dimethyl Maleic Anhydride | 0.25% | Colorless | <10 | <10 | 6.43 | 10-20 | <10 |
| 2,3-Dimethyl Maleic Anhydride | 0.50% | Colorless | 10-20 | 10-20 | 7.07 | 10-20 | <10 |
| Dichloromaleic Anhydride | 0.25% | Slightly Yellow | nt | nt | nt | nt | nt |
| Dichloromaleic Anhydride | 0.50% | Yellow | nt | nt | nt | nt | nt |
| Bromomaleic Anhydride | 0.25% | Slightly Yellow | 120-180 | 30-45 | nt | nt | nt |
| Bromomaleic Anhydride | 0.50% | Yellow | 60-75 | 10-20 | nt | nt | nt | nt = not tested

By way of the background, the fixture speed is the time from joining the two substrates (each of which being about 1 inch wide and being aligned with about a 0.5 inch overlap) sufficient to hold a 3 kg weight.

Accelerated aging at a temperature of 55° C. for a period of time of six weeks of the compositions of ethyl cyanoacrylate [in the form of the commercially available product, LOCTITE 401 (which is reported on its MSDS to have 60-100% ethyl-2-cyanoacrylate and 5-10% of a proprietary thickener)] containing 0.5% by weight of 2,3-dimethyl maleic anhydride led to yellowing and a slowing of fixture times, as shown below in Table 2.

TABLE 2

| | 6 weeks @ 55° C. | | | |
|---|---|---|---|---|
| Sample | Appearance | Fixtures Time Mild Steel | Fixtures Time Paper | Fixtures Time Aluminum |
| LOCTITE 401 | colorless | 15-20 s | 10-15 s | 10-15 s |

TABLE 2-continued

| | 6 weeks @ 55° C. | | | |
|---|---|---|---|---|
| Sample | Appearance | Fixtures Time Mild Steel | Fixtures Time Paper | Fixtures Time Aluminum |
| LOCTITE 401 + 0.5% 2,3-Dimethyl Maleic Anhydride + 0.5% Ethylene Sulfite | straw yellow | >5 min | >5 min | >2 min |
| LOCTITE 401 + 0.5% 2,3-Dimethyl Maleic Anhydride + 0.5% Pentafluoro-benzonitrile | straw yellow | 50-60 s | 10-20 s | <10 s |

Phthalic anhydride and derivatives thereof were also evaluated in ethyl cyanoacrylate compositions, results of which are set forth below in Table 3.

TABLE 3

| Added Anhydride | Added Level | Appearance | Fixture Time (secs) Mild Steel | Fixture Time (secs) Paper | Heat Aging (N/mm$^2$) 500 hours 120° C. on GBMS | Accelerated Aging for 3 Days @ 82° C. Fixture Time (secs) Mild Steel | Accelerated Aging for 3 Days @ 82° C. Fixture Time (secs) Paper |
|---|---|---|---|---|---|---|---|
| Control | — | | <10 | <10 | 2.29 | 10-20 | <10 |
| Phthalic Anhydride | 0.50% | Colorless | 20-30 | 45-60 | nt | Nt | nt |
| Hexahydro-4-methylphthalic anhydride | 0.25% | Colorless | <10 | <10 | 4.2 | 10-20 | <10 |
| Hexahydro-4-methylphthalic anhydride | 0.50% | Colorless | <10 | <10 | 4.42 | 10-20 | <10 |
| Tetrafluorophthalic Anhydride | 0.25% | Colorless | >300 | >300 | nt | Nt | nt |
| Tetrafluorophthalic Anhydride | 0.50% | Colorless | >300 | >300 | nt | Nt | nt |
| Epoxidized 1,2,3,6 Tetrahydrophthalic Anhydride | 0.25% | Colorless | 10-20 | <10 | 6.61 | 40-50 | <10 |

TABLE 3-continued

| Added Anhydride | Added Level | Appearance | Fixture Time (secs) Mild Steel | Fixture Time (secs) Paper | Heat Aging (N/mm²) 500 hours 120° C. on GBMS | Accelerated Aging for 3 Days @ 82° C. Fixture Time (secs) Mild Steel | Accelerated Aging for 3 Days @ 82° C. Fixture Time (secs) Paper |
|---|---|---|---|---|---|---|---|
| Epoxidized 1,2,3,6 Tetrahydrophthalic Anhydride | 0.50% | Colorless | 10-20 | <10 | 6.91 | 30-40 | 20-30 |
| 3,4,5,6-Tetrahydro Phthalic Anhydride | 0.25% | Colorless | 20-30 | <10 | 7.47 | 10-20 | <10 |
| 3,4,5,6-Tetrahydro Phthalic Anhydride | 0.50% | Colorless | 30-45 | <10 | 10.12 | 10-20 | <10 | nt = not tested

The last two entries in Table 3 above are a hydrogenated aromatic anhydride—tetrahydro phthalic anhydride—evaluated in ethyl cyanoacrylate composition at a level of 0.25 and 0.5 weight percent. Heat aging results (albeit in LOCTITE 401) are set forth below in Table 4 and in FIG. 1.

TABLE 4

| Sample | Heat Aging 500 hrs 120° C. on GBMS (N/mm²) |
|---|---|
| LOCTITE 401 | 5.3 |
| LOCTITE 401 + 0.25% Tetrahydrophthalic Anhydride | 7.47 |
| LOCTITE 401 + 0.5% Tetrahydrophthalic Anhydride | 10.12 |

A number of samples were evaluated for their fixture time on a variety of substrates and stability under accelerated aging conditions. The samples evaluated were labeled as Sample A-D, respectively, and the constituents of which are set forth below in Table 5. As a control, LOCTITE 401 was used.

TABLE 5

| Component Type | Component Identity | Sample/Amt (wt %) A | B | C | D |
|---|---|---|---|---|---|
| CA Additives | LOCTITE 401 | 99.0 | 99.0 | 99.0 | 99.0 |
| | Dimethyl Maleic Anhydride | 0.5 | 0.5 | — | — |
| | Tetrahydrophthalic Anhydride | — | — | — | 0.5 |
| | Ethylene Sulfite | 0.5 | — | — | — |
| | Pentafluorobenzonitrile | — | 0.5 | 0.5 | 0.5 |

Figure 2:
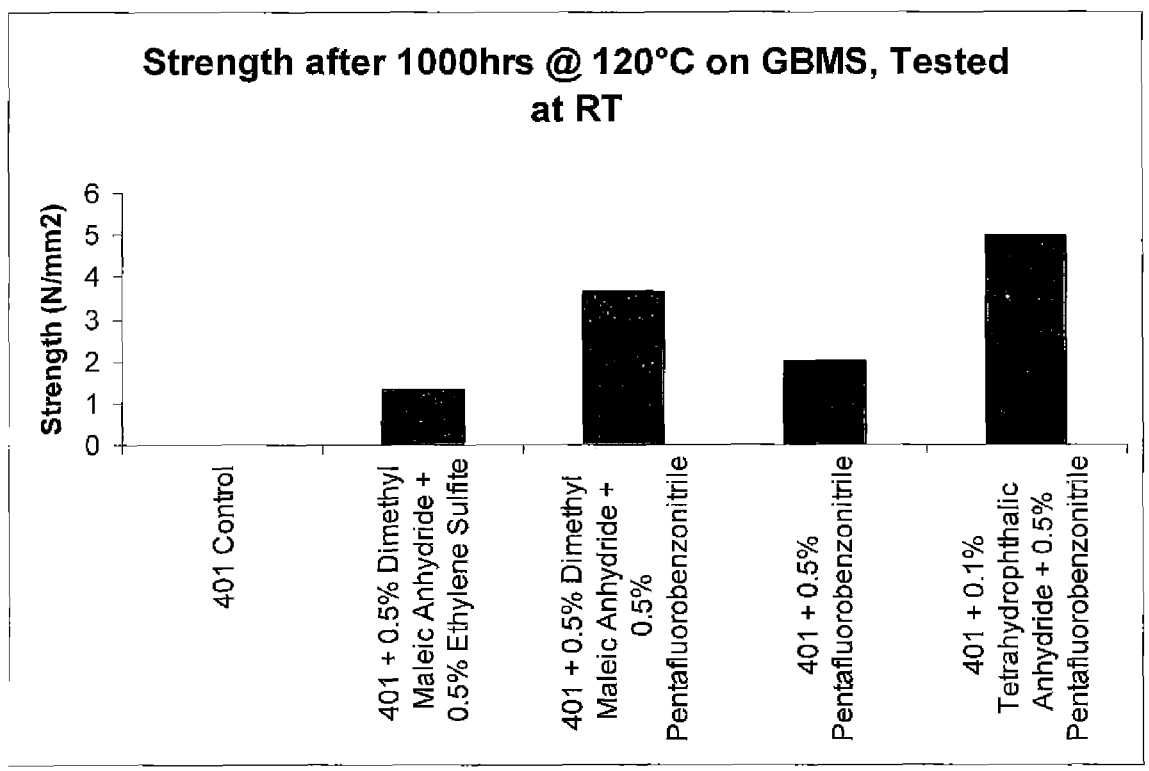
FIG. 2 depicts a bar chart of shear strength retained after heat aging at a temperature of 120° C. for a period of time of 1,000 hours for a cyanoacrylate composition with a hydrogenated anhydride at a level of 0.1% and a benzonitrile at a level of 0.5% compared with a control, LOCTITE 401, and LOCTITE 401 with (a) dimethyl maleic anhydride or ethylene sulfide and (b) dimethyl maleic anhydride and pentafluorobenzonitrile and (c) pentafluorobenzonitrile on grit blasted mild steel substrates.

In Table 6 below, performance data of Samples A-D, together with LOCTITE 401, are presented. LOCTITE 401 shows 0 strength in N/mm² for the heat aging data presented in the first row (FIG. 2 shows this data in a graphic representation) and a value of less than 10 seconds in the second row.

TABLE 6

| Physical Property | Sample A | B | C | D |
|---|---|---|---|---|
| 1000 hours @ 120° C. on GBMS (N/mm²) | 1.33 | 3.66 | 1.98 | 4.95 |
| Fixture Time (secs), after 6 weeks @ 55° C. | 90-120 | <10 | <10 | <10 |

A number of formulated samples were evaluated for their fixture time on a variety of substrates and shelf life under accelerated aging conditions. The samples evaluated were labeled as Sample E-H, respectively, and the constituents of which are set forth below in Table 7. Each of the samples contained a stabilizer package, as well. As a control, again LOCTITE 401 was used.

TABLE 7

| Component Type | Component Identity | Sample/Amt (wt %) E | F | G | H |
|---|---|---|---|---|---|
| CA Additives | LOCTITE 401 | Balance | Balance | Balance | Balance |
| | 3,4,5,6-Tetrahydrophthalic Anhydride | 0 | 0.1 | 0 | 0.1 |
| | Pentafluorobenzonitrile | 0 | 0 | 0.5 | 0.5 |

In Table 8 below, performance of Samples E-H are presented. LOCTITE 401 was again used as a control. We applied each sample to the substrates listed below in Table 8 and measured fixture time and heat aging strength on GBMS.

TABLE 8

| Physical Property | | Sample E | F | G | H |
|---|---|---|---|---|---|
| Fixture Time (secs) | MS | <10 | <10 | <10 | <10 |
| | Wood | <10 | <10 | <10 | <10 |
| | PC | <10 | <10 | <10 | <10 |
| Heat Aging (Nmm²) | 500 hours @ 120° C. | 5.15 | 7.71 | 9.91 | 10.29 |
| | 1000 hours @ 120° C. | 2.51 | 3.25 | 8.74 | 9.2 |

Conventional ethyl cyanoacrylate compositions have an upper limit on their operating temperature of about 80° C. That is, above such temperature, a cured cyanoacrylate composition oftentimes shows the beginning of degradation and thus a sacrifice of bond strength. Additive chemistry (such as phthalic anhydride) has allowed this limit to be increased, but cyanoacrylate compositions with such an additive suffer from increased fixture times, which is an undesirable observation.

3,4,5,6-Tetrahydrophthalic anhydride showed benefits heat aging at a temperature of 120° C., while not sacrificing fixture times. That anhydride provided beneficial properties on certain bonded assemblies, such as bonds formed between GBMS substrates aged at a temperature of 120° C.

And, the use of 3,4,5,6-tetrahydrophthalic anhydride in combination with a benzonitrile, such as pentafluorobenzonitrile, allows for the formulation of stable, fast fixturing and substantially colorless cyanoacrylate compositions.

What is claimed is:

1. A cyanoacrylate adhesive composition, comprising:
   (a) a cyanoacrylate component, and
   (b) a hydrogenated aromatic anhydride.

2. The composition according to claim 1, further comprising a benzonitrile.

3. The composition according to claim 1, wherein the hydrogenated aromatic anhydride is a hydrogenated phthalic anhydride.

4. The composition according to claim 1, wherein the hydrogenated aromatic anhydride is a tetrahydrophthalic anhydride.

5. The composition according to claim 2, wherein the benzonitrile is selected from the group consisting of 3,5-dinitrobenzonitrile; 2-chloro-3,5-dinitrobenzonitrile; pentafluorobenzonitrile; α,α,α-2-tetrafluoro-p-tolunitrile; and tetrachloroterphthalonitrile.

6. The composition of claim 1, further comprising an acidic stabilizer and a free radical inhibitor.

7. The composition according to claim 1, wherein the cyanoacrylate component is selected from materials within the structure $H_2C=C(CN)-COOR$, wherein R is selected from $C_{1-15}$ alkyl, alkoxyalkyl, cycloalkyl, alkenyl, aralkyl, aryl, allyl and haloalkyl groups.

8. The composition according to claim 1, wherein the cyanoacrylate component comprises ethyl-2-cyanoacrylate.

9. The composition according to claim 1, further comprising an accelerator component selected from the group consisting of calixarene, oxacalixarene, silacrown, cyclodextrin, crown ether, poly(ethyleneglycol) di(meth)acrylate, ethoxylated hydric compound, and combinations thereof.

10. The composition according to claim 9, wherein the calixarene is tetrabutyl tetra[2-ethoxy-2-oxoethoxy]calix-4-arene.

11. The composition according to claim 9, wherein the crown ether is selected from members within the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7, and combinations thereof.

12. The composition according to claim 9, wherein the poly(ethyleneglycol) di(meth)acrylate is within the following structure:

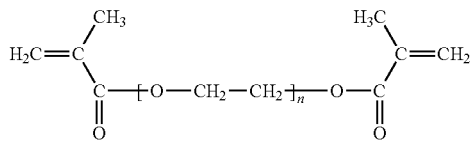

wherein n is greater than 3.

13. The composition according to claim 1, further comprising additives selected from the group consisting of shock resistant additives, thixotropy conferring agents, thickeners, dyes, thermal degradation resistance enhancers, and combinations thereof.

14. Reaction products of the composition according to claim 1.

15. A method of bonding together two substrates, comprising the steps of:
   applying a cyanoacrylate-containing composition according to claim 1, to at least one of the substrates and
   mating together the substrates for a time sufficient to permit the adhesive to fixture.

16. A method of preparing a cyanoacrylate-containing composition according to claim 1, comprising the steps of:
   providing a cyanoacrylate component, and combining therewith with mixing a hydrogenated aromatic anhydride and optionally a benzonitrile.

17. A method of conferring improved thermal resistance to a cured product of a cyanoacrylate composition without compromising at least one of fixture speed, stability or color, comprising the steps of:
   providing a cyanoacrylate composition; and
   providing a hydrogenated aromatic anhydride and optionally a benzonitrile.

18. A cyanoacrylate composition comprising a cyanoacrylate component, wherein the improvement comprises adding to the cyanoacrylate component a hydrogenated aromatic anhydride to improve the heat resistance of cured reaction products thereof without compromising the fixture time of the cyanoacrylate composition.

19. The composition of claim 18, further comprising a benzonitrile.

* * * * *